United States Patent
Lee et al.

(10) Patent No.: US 8,299,144 B2
(45) Date of Patent: Oct. 30, 2012

(54) TPO NANOCOMPOSITES AND METHODS OF USE

(75) Inventors: Choon Soo Lee, Seoul (KR); Min Hee Lee, Gyeonggi-Do (KR); Sungrok Ko, Deajeon (KR); Byungkook Nam, Deajeon (KR); Se Hoon Kim, Deajeon (KR)

(73) Assignees: Hyundai Motor Company, Seoul (KR); Kia Motors Corporation, Seoul (KR); Honam Petrochemical Corporation, Seoul (KR)

( * ) Notice: Subject to any disclaimer, the term of this patent is extended or adjusted under 35 U.S.C. 154(b) by 68 days.

(21) Appl. No.: 12/752,580

(22) Filed: Apr. 1, 2010

(65) Prior Publication Data

US 2011/0130506 A1    Jun. 2, 2011

(30) Foreign Application Priority Data

Nov. 30, 2009    (KR) .................. 10-2009-0117241

(51) Int. Cl.
*C08J 3/20*    (2006.01)

(52) U.S. Cl. ......... 523/351; 523/219; 524/445; 524/447

(58) Field of Classification Search .................. 523/351, 523/219; 524/445, 447
See application file for complete search history.

(56) References Cited

U.S. PATENT DOCUMENTS

2007/0117899 A1 *  5/2007  Ouhadi .................. 524/425

FOREIGN PATENT DOCUMENTS

| JP | 2002-195499 A | 7/2002 |
|---|---|---|
| JP | 2005-315294 A | 11/2005 |
| JP | 2008-291891 A | 12/2008 |
| JP | 2009-121568 A | 6/2009 |
| KR | 10-2009-0053219 A | 5/2009 |
| KR | 10-2009-0086725 A | 8/2009 |

* cited by examiner

*Primary Examiner* — Edward Cain
(74) *Attorney, Agent, or Firm* — Edwards Wildman Palmer LLP; Peter F. Corless

(57) ABSTRACT

Disclosed is a thermoplastic polyolefin (TPO) nanocomposite composition, more particularly a TPO nanocomposite composition including a polypropylene resin, a polyethylene resin, a rubber resin, a nanoclay master batch and a glass bubble master batch. Since the disclosed TPO nanocomposite composition has low specific gravity and superior gloss reducing effect and scratch resistance, it may be usefully applied to light automobile parts, uncoated automobile exterior parts, or the like.

10 Claims, 1 Drawing Sheet

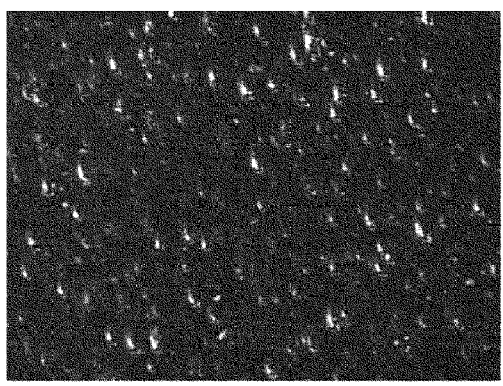 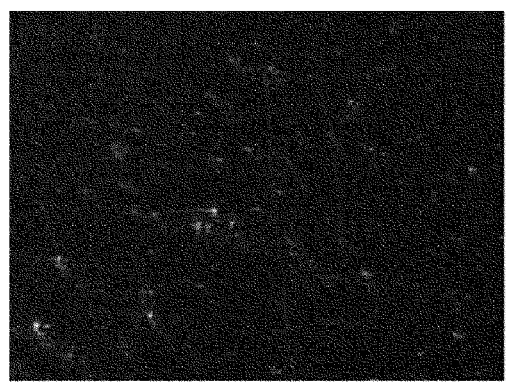
(a)          (b)

TPO NANOCOMPOSITES AND METHODS OF USE

CROSS-REFERENCE(S) TO RELATED APPLICATIONS

This application claims under 35 U.S.C. §119(a) the benefit of Korean Patent Application No. 10-2009-0117214, filed on Nov. 30, 2009, the entire contents of which are incorporated herein by reference.

BACKGROUND OF THE INVENTION

1. Field of the Invention

The present invention relates, generally, to a thermoplastic polyolefin (TPO) nanocomposite composition. Preferably, the TPO nanocomposite composition of the present invention has low specific gravity and superior gloss reducing effect and scratch resistance, and may preferably be used for light automobile parts, uncoated automobile exterior parts, or the like.

2. Description of Related Art

In general, thermoplastic polyolefin (TPO) materials, commonly used as automobile exterior parts, comprise polypropylene resin as matrix, rubber for improving impact resistance, and an inorganic filler for suitably enhancing rigidity. In addition, various additives for improving processability and compatibility are often included. Although talc has been preferred as the inorganic filler, alternative light materials have been featured in recent years in the automobile manufacture industry for the improvement of fuel efficiency and to avoid environmental pollution.

Conventionally, plastic exterior parts for automobiles were mostly coated before use, and thus, appearance quality was not considered since the resin was not directly exposed to the outside environment. Recently, however, as the elimination of surface coating of some automobile exterior parts is demanded with regard to price competitiveness and environment friendliness, superior appearance quality is suitably required for resins.

Nanoclay, an inorganic filler like talc, has a characteristic layered structure. Since the development of a completely exfoliated nylon/nanoclay composite by the Toyota Central R&D Labs in 1997, active research has been carried out to develop a new TPO material by dispersing nanoclay in polypropylene. Completely exfoliated nanoclay is very useful in reducing material weight because mechanical properties comparable to or better than those of a polypropylene/talc composite comprising dozens of wt % of talc can be attained only with an amount of several wt %. Korean Paten Publication No. 2009-086725 and Korean Patent No. 713,703, incorporated by reference in their entireties herein, disclose propylene resin compositions comprising nanoclay. However, it is not easy to satisfy the gloss and scratch resistance requirements of uncoated automobile exterior parts with a low content of nanoclay, and additional strengthening materials capable of reducing gloss and enhancing scratch resistance are suitably required.

Glass bubbles with a hollow structure are glass beads having a specific gravity of about 0.6 and a diameter of 30 μm. With not so large specific gravity as compared to polypropylene resin, the glass bubble provides a suitable gloss reducing effect caused by diffused reflection on the surface when dispersed in polyolefin. Further, due to its slipperiness, it can suitably improve scratch resistance of the polypropylene resin. U.S. Pat. Nos. 6,403,692 and 6,455,630 and Korean Patent No. 683,230, incorporated by reference in their entireties herein, disclose polypropylene resins comprising glass bubbles. However, there is a need in the art for the development of a method to introduce the glass bubbles for extrusion without being broken.

The above information disclosed in this the Background section is only for enhancement of understanding of the background of the invention and therefore it may contain information that does not form the prior art that is already known in this country to a person of ordinary skill in the art.

SUMMARY OF THE INVENTION

The present invention is directed, in part, to a thermoplastic polyolefin (TPO) nanocomposite material suitable for light uncoated automobile exterior parts that can preferably be prepared by adding a small amount of nanoclay to suitably attain desired rigidity, and using glass bubbles to reduce gloss and improve scratch resistance, the glass bubbles being preferably introduced by side feeding.

Accordingly, to the present invention preferably provides a TPO nanocomposite composition with low specific gravity, reduced gloss and superior scratch resistance.

The present invention preferably provides a TPO nanocomposite composition including a polypropylene resin, a polyethylene resin, a rubber resin, a nanoclay master batch and a glass bubble master batch.

In preferred embodiments, the TPO nanocomposite composition of the present invention, wherein a small amount of layered nanoclay is highly dispersed instead of talc, has low specific gravity even with desired rigidity. In further preferred embodiments, since the addition of glass bubbles reduces gloss and improves scratch resistance, embodiments of the present invention as described herein may be useful, for example, for uncoated automobile exterior parts.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWING

The above and other objects, features and advantages of the present invention will become apparent from the following description of preferred embodiments given in conjunction with the accompanying drawing, in which:

FIG. 1 (a) is an optical micrograph of a thermoplastic polyolefin (TPO) nanocomposite composition prepared by side feeding of a 13.3 wt % glass bubble master batch, and FIG. 1 (b) is an optical micrograph of a TPO nanocomposite composition prepared by main feeding of a 4 wt % glass bubble master batch.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DESCRIPTION

As described herein, the present invention includes a thermoplastic polyolefin (TPO) nanocomposite composition comprising a polypropylene resin, a polyethylene resin, a rubber resin, a nanoclay master batch and a glass bubble master batch.

In one embodiment, the TPO nanocomposite comprises 30 to 60 wt % of a polypropylene resin, 1 to 10 wt % of a polyethylene resin, 10 to 40 wt % of a rubber resin, 4 to 20 wt % of a nanoclay master batch, and 10 to 30 wt % of a glass bubble master batch.

The present invention also features an uncoated automobile exterior part comprising the TPO nanocomposite composition according to any of the aspects described herein.

The present invention also features a method for preparing a TPO nanocomposite comprising introducing the glass bubble master batch according to any of the aspects described herein.

The advantages, features and aspects of the invention will become apparent from the following description of the embodiments with reference to the accompanying drawings, which is set forth hereinafter.

In preferred embodiments, the present invention provides a thermoplastic polyolefin (TPO) nanocomposite composition comprising a polypropylene resin, a polyethylene resin, a rubber resin, a nanoclay master batch and a glass bubble master batch.

Preferably, the polypropylene resin serves as a matrix of the composition and may be one or more selected from polypropylene, polyethylene-propylene copolymer and polypropylene-butadiene copolymer. Preferably, a polyethylene-propylene copolymer with an ethylene content of 3 to 5 wt % is used. According to certain preferred embodiments, it is preferred that a melt index is from 30 to 38 g/10 min (230° C.) and an average molecular weight is from 50,000 to 300,000. If the average molecular weight is smaller, flexural modulus or heat deflection temperature may be unfavorable. In other preferred embodiments, if it is larger, fluidity may be suitably unfavorable. Preferably, the polypropylene resin is used in an amount of 30 to 60 wt %. If it is used in an amount less than 30 wt %, rigidity of the composite may be insufficient. In other embodiments, if it is used in an amount exceeding 60 wt %, dimensional stability may be unfavorable because of excessive shrinkage.

According to certain embodiments of the present invention, the polyethylene resin may be one or more selected from high-density polyethylene, low-density polyethylene and linear low-density polyethylene. It is preferred that a melt index is from 1 to 7 g/10 min (190° C.) and a molecular weight is from 130,000 to 150,000. If the molecular weight is smaller, flexural modulus and gloss may be suitably unfavorable. IN other embodiments, if it is larger, fluidity may be suitably unfavorable. Preferably, the polyethylene resin is used in an amount of 1 to 10 wt %. If it is used in an amount less than 1 wt %, gloss control effect may be only slight. In contrast, if it is used in an amount exceeding 10 wt %, impact resistance may decrease because of reduced dispersibility.

According to certain embodiments of the present invention, the rubber resin is used to suitably improve impact resistance and may be one or more selected from polyethylene-butylene copolymer, polyethylene-octene copolymer and ethylene propylene diene monomer (EPDM). In certain embodiments, a polyethylene-octene copolymer having a melt index from 25 to 35 g/10 min (190° C.) and an octene content from 10 to 15 wt % is preferred. Preferably, if the octene content is less than 10 wt %, compatibility with the polypropylene matrix may be problematic. In other embodiments, if it exceeds 15 wt %, impact strength may suitably decrease. Preferably, the rubber resin is used in an amount of 10 to 40 wt %. If it is used in an amount less than 10 wt %, impact resistance and dimensional stability may be unfavorable. Meanwhile, if it is used in an amount exceeding 40 wt %, rigidity may decrease.

According to other certain embodiments of the present invention, the nanoclay master batch is used instead of talc in order to provide low specific gravity. Preferably, the master batch comprises 20 to 30 wt % of maleic anhydride grafted polypropylene, 30 to 50 wt % of nanoclay and 30 to 40 wt % of polyethylene-propylene copolymer. In certain preferred embodiments, if the nanoclay content is smaller, a large amount of a low molecular weight compatibilizer is preferably used when adding the nanoclay master batch to the composite, which may result in decreased heat deflection temperature. In other certain embodiments, if the nanoclay content is larger, the nanoclay may not be dispersed well. Preferably, the nanoclay master batch is used in an amount of 4 to 20 wt %. If it is used in an amount less than 4 wt %, dimensional stability and rigidity may be degraded. In other exemplary embodiments, if it is used in an amount exceeding 20 wt %, impact strength may decrease and product cost suitably increases.

According to certain embodiments of the present invention, the he glass bubble master batch is used to suitably reduce gloss and improve scratch resistance. Preferably, the glass bubble master batch comprises 50 to 90 wt % of polypropylene and 10 to 50 wt % of hollow glass bubble with a size of 10 to 300 µm. If the glass bubble has a smaller size, diffused reflection of light may be suitably insufficient. In other embodiments, if it has a larger size, appearance may be suitably unfavorable. If the glass bubble content in the master batch is smaller than 10 wt %, the glass bubble master batch has to be used in suitably large quantity. Meanwhile, if the glass bubble content exceeds 50 wt %, the glass bubble may not be dispersed well in the master batch. Preferably, the glass bubble master batch is used in an amount 10 to 30 wt %. If it is used in an amount less than 10 wt %, gloss reducing effect may be suitably insufficient. In other further embodiments, if it is used in an amount exceeding 30 wt %, impact strength may decrease and product cost increases. Preferably, when introducing the glass bubble master batch to the TPO nanocomposite composition, side feeding may be selected to prevent the glass bubble from being broken during extrusion.

In certain preferred embodiments, the TPO nanocomposite composition of the present invention may further comprise an antioxidant, a UV stabilizer, a flame retardant, a coloring agent, a scratch resistance improving agent, or the like, if necessary.

In other preferred embodiments, the TPO nanocomposite composition of the present invention has low specific gravity, good gloss reducing effect and superior scratch resistance, while having mechanical properties comparable to or better than the polypropylene resin comprising talc. Therefore, it may be useful for light automobile parts, uncoated automobile exterior parts, or the like.

EXAMPLES

Examples and experiments according to certain preferred embodiments of the present invention are now be described.

The following examples are for illustrative purposes only and not intended to limit the scope of the present invention.

Examples 1 to 4

Thermoplastic polyolefin (TPO) nanocomposite compositions were prepared using polyethylene-propylene copolymer with a melt index of 35 g/10 min (230° C.) and an ethylene content of 4 wt %, as the polypropylene resin, and high-density polyethylene with a melt index of 5 g/10 min (190° C.) and an average molecular weight of 140,000, as the polyethylene resin. The rubber resin was ethylene-octene copolymer with a melt index of 30 g/10 min (190° C.) and an octene content of 12.5 wt %. The nanoclay master batch was prepared mixing 24 wt % of maleic anhydride grafted polypropylene, 40 wt % of nanoclay and 36 wt % of polyethylene-propylene copolymer in a Henschel mixer for 3 minutes at 1500 rpm and extruding at a processing condition of 160-210° C. and 500 rpm using an a 12-screw extruder with a length to diameter ratio (L/D) of 32. The glass bubble master batch comprised 70 wt % of polypropylene and 30 wt % of glass bubble. The glass bubble was hollow glass beads with a size of 30 μm. The glass bubble master batch was added to the TPO nanocomposite composition by side feeding. Detailed compositions are given in Table 1.

Example 5

A TPO nanocomposite composition was prepared in the same manner as in Example 1 by adding 4 wt % of the glass bubble master batch by main feeding.

Comparative Example 1

A TPO nanocomposite composition was prepared in the same manner as in Example 1 by using talc instead of the nanoclay master batch.

Comparative Example 2

A TPO nanocomposite composition was prepared in the same manner as in Example 1 without using the nanoclay master batch and the glass bubble master batch.

TABLE 1-continued

| Contents (wt %) | Examples | | | | | Comparative Examples | |
|---|---|---|---|---|---|---|---|
| | 1 | 2 | 3 | 4 | 5 | 1 | 2 |
| Talc | — | — | — | — | — | 7 | — |
| Glass bubble master batch | 13.3 | 10 | 13.3 | 10 | 4 | 13.3 | — |

Propylene-ethylene copolymer: KOPELEN (Honam Petrochemical)
High-density polyethylene: HIVOREX (Honam Petrochemical)
Ethylene-octene copolymer: Engage (Dow)
Maleic anhydride grafted polypropylene: [ADPOLY (Honam Petrochemical)
Nanoclay: Nanomer (Nanocor)
Talc: KCM-6300 (KOCH)
Glass bubble: Scotchlite (3M)

Physical Property Test

1) Specific Gravity

Specific gravity was measured in accordance with ASTM D1505 using a 2 mm test specimen.

2) Gloss

Gloss at a slope angle of 60° was measured in accordance ASTM D1003 using an extruded 3 mm plate test specimen.

3) Shrinkage

Change in length of an extruded ASTM D638 tensile test specimen was measured in accordance with Honam Petrochemical's test method within 48 hours of extrusion.

4) Flexural Modulus

Flexural modulus was measured in accordance with ASTM D790 using a 6 mm-thick test specimen under the condition of 100 mm span and 10 mm/min extrusion speed.

5) Melt Index

Melt index was measured in accordance with ASTM D1238 at 230° C. at a load of 2.16 kg.

6) Scratch Resistance

A scratching needle (sapphire ball, diameter=0.5 mm) was mounted on a test specimen at a load of 500 g. After scratching at a speed of 100 mm/sec, the width of the scratch was measured.

TABLE 2

| Physical properties | Examples | | | | | Comparative Examples | |
|---|---|---|---|---|---|---|---|
| | 1 | 2 | 3 | 4 | 5 | 1 | 2 |
| Specific gravity | 0.91 | 0.92 | 0.91 | 0.91 | 0.91 | 0.98 | 0.91 |
| Gloss (60°) | 48 | 60 | 52 | 59 | 72 | 57 | 85 |
| Shrinkage (%) | 0.77 | 0.71 | 0.75 | 0.75 | 0.85 | 0.90 | 1.1 |
| Flexural modulus (kg/cm$^2$) | 13,000 | 11,900 | 11,700 | 11,600 | 12,500 | 12,100 | 9,500 |
| Melt index (g/10 min) | 21 | 22 | 25 | 20 | 25 | 31 | 42 |
| Scratch (μm) | 320 | 360 | 330 | 370 | 380 | 340 | 580 |

TABLE 1

| Contents (wt %) | Examples | | | | | Comparative Examples | |
|---|---|---|---|---|---|---|---|
| | 1 | 2 | 3 | 4 | 5 | 1 | 2 |
| Polypropylene resin | 42.2 | 45.5 | 47.2 | 50.5 | 51.5 | 52.7 | 73 |
| Polyethylene resin | 5 | 5 | 5 | 5 | 5 | 5 | 5 |
| Rubber resin | 22 | 22 | 22 | 22 | 22 | 22 | 22 |
| Nanoclay master batch | 17.5 | 17.5 | 12.5 | 12.5 | 17.5 | — | — |

As seen from Table 2, the TPO nanocomposite compositions of the present invention showed superior mechanical properties in shrinkage and scratch resistance when compared with those of Comparative Examples 1 and 2, wherein the nanoclay master batch was not used. In particular, they had low specific gravity. Further, it can be seen that gloss was reduced and scratch resistance was suitably improved when compared with the TPO nanocomposite composition of Comparative Example 2 wherein the glass bubble master batch was not added. Also, as seen from FIG. 1, main feeding of the glass bubble (Example 5, FIG. 1(b)) resulted in considerable breaking of the glass bubble when compared with side feeding (FIG. 1(a)). Thus, it can be seen that side feeding of the glass bubble is preferred.

As described herein, the TPO nanocomposite composition of the present invention wherein a small amount of nanoclay is used instead of talc has low specific gravity as well as comparable mechanical properties, thereby enabling decrease of weight. Further, since the addition of glass bubbles reduces gloss and improves scratch resistance, it may be useful for uncoated automobile exterior parts.

While the present invention has been described with respect to the specific embodiments, it will be apparent to those skilled in the art that various changes and modifications may be made without departing from the spirit and scope of the invention as defined in the following claims.

What is claimed is:

1. A thermoplastic polyolefin (TPO) nanocomposite composition comprising a polypropylene resin, a polyethylene resin, a rubber resin, a nanoclay master batch and a glass bubble master batch,
    wherein the nanoclay master batch comprises:
    20 to 30 wt % of maleic anhydride grafted polypropylene;
    30 to 50 wt % of nanoclay; and
    30 to 40 wt % of polyethylene-propylene copolymer.

2. The TPO nanocomposite composition according to claim 1, which comprises:
    30 to 60 wt % of a polypropylene resin;
    1 to 10 wt % of a polyethylene resin;
    10 to 40 wt % of a rubber resin;
    4 to 20 wt % of a nanoclay master batch; and
    10 to 30 wt % of a glass bubble master batch.

3. The TPO nanocomposite composition according to claim 1, wherein the polypropylene resin has an average molecular weight of 50,000 to 300,000 and is one or more selected from the group consisting of: polypropylene, polyethylene-propylene copolymer and polypropylene-butadiene copolymer.

4. The TPO nanocomposite composition according to claim 1, wherein the polyethylene resin is one or more selected from the group consisting of: high-density polyethylene, low-density polyethylene and linear low-density polyethylene.

5. The TPO nanocomposite composition according to claim 1, wherein the rubber resin is one or more selected from the group consisting of: polyethylene-octene copolymer, polyethylene-butylene copolymer and ethylene propylene diene monomer (EPDM).

6. The TPO nanocomposite composition according to claim 1, wherein the glass bubble master batch comprises:
    50 to 90 wt % of polypropylene; and
    10 to 50 wt % of glass bubble.

7. The TPO nanocomposite composition according to claim 1, wherein the glass bubble has a size of 10 to 300 µm.

8. An uncoated automobile exterior part comprising the TPO nanocomposite composition according to claim 1.

9. A method for preparing a TPO nanocomposite comprising introducing the glass bubble master batch according to claim 1 by side feeding.

10. A thermoplastic polyolefin (TPO) nanocomposite composition comprising a polypropylene resin in an amount of 30 to 60 wt % based on total weight of the composition, a polyethylene resin in an amount of 1 to 10 wt % based on total weight of the composition, a rubber resin in an amount of 10 to 40 wt % based on total weight of the composition, a nanoclay master batch in an amount of 10 to 30 wt % based on total weight of the composition and a glass bubble master batch,
    wherein the nanoclay master batch comprises (i) 20 to 30 wt % of maleic anhydride grafted polypropylene; (ii) 30 to 50 wt % of nanoclay; and (iii) 30 to 40 wt % of polyethylene-propylene copolymer.

* * * * *

UNITED STATES PATENT AND TRADEMARK OFFICE
CERTIFICATE OF CORRECTION

PATENT NO.         : 8,299,144 B2                                    Page 1 of 1
APPLICATION NO.    : 12/752580
DATED              : October 30, 2012
INVENTOR(S)        : Choon Soo Lee et al.

It is certified that error appears in the above-identified patent and that said Letters Patent is hereby corrected as shown below:

Title Page

At Item (30), Please change "Foreign Application Priority Data" to read:

--Nov. 30, 2009   (KR)........................10-2009-011721<u>4</u>--

Signed and Sealed this
Twenty-third Day of April, 2013

Teresa Stanek Rea
*Acting Director of the United States Patent and Trademark Office*